United States Patent Office 3,806,427
Patented Apr. 23, 1974

3,806,427
PURIFICATION OF PYRROLIDONE WITH A
BORON COMPOUND
Jay A. Gervasi, Trumbull, and Janardan D. Upadhyaya, Stamford, Conn., assignors to Alrac Corporation, Stamford, Conn.
No Drawing. Filed June 15, 1972, Ser. No. 263,320
Int. Cl. B01d 3/10
U.S. Cl. 203—50     6 Claims

ABSTRACT OF THE DISCLOSURE 2-pyrrolidone can be purified through distillation from a mixture of impure 2-pyrrolidone and a boron oxide derivative.

DETAILED DESCRIPTION

The present invention pertains to the purification of 2-pyrrolidone. It is well known in the art that the 2-pyrrolidone which is commercially available will often generally contain various impurities which can be detrimental in certain uses of the material. To date, it has been thought that the principal impurities or contaminants are water itself, butyrolactone, ammonia and various other basic materials. On the basis of these premises, it has been suggested that 2-pyrrolidone can be purified to a grade suitable, for example, for polymerization through the use of various acid anhydrides, see for example U.S. Pat. No. 2,806,856, and that the water and basic materials can be removed through the use of phosphorus pentoxide, see for example U.S. Pat. No. 2,944,944. Other workers have suggested that the impurities present include amides and esters of 1,4-diaminobutane and have consequently utilized repeated caustic hydrolysis and distillation to obtain material suitable for the desired application, see for example U.S. Pat. No. 3,647,764.

Heretofore the material obtained upon polymerization of 2-pyrrolidone has not been capable of withstanding the rigors of melt extrusion required in the formation of pellets and fibers. As a result, 2-pyrrolidone polymers have previously never achieved commercial importance and consequently the suitability of various known purification techniques for the monomer have never been tested against the requirements of a large scale preparation. Recent developments and improvements however in the process of polymerizing 2-pyrrolidone, see e.g., British patent specification No. 1,267,446, have resulted in the formation of material which promises to achieve considerable commercial success. Consequently, the effect of monomer purity on the polymerization and the available methods for upgrading that purity have come under renewed examination.

The method of purifying 2-pyrrolidone disclosed by Robinson in U.S. Pat. No. 2,806,856 suffers from the serious disadvantage that two distinctly different distillations are involved. Thus 2-pyrrolidone and acid anhydride are combined for a first distillation and the product obtained is then subjected to a second distillation from a base. Although the process of Clayton disclosed in U.S. Pat. No. 2,944,944 reduces the number of manipulations to a single distillation, it requires the use of phosphorus pentoxide, an extremely deliquescent material which is a local irritant and corrosive to the skin, mucous membranes and eyes. Accordingly the necessity to exclude moisture while storing the purification reagent and the toxicity problems which are attendant to the handling of it by workers are undesirable in large scale commercial production operations.

The present invention is based upon the discovery that boron oxide and various derivatives thereof can be advantageously employed in the purification of pyrrolidone. The materials envisioned do not require extraordinary precautions against moisture nor do they pose any serious toxicity dangers.

The present process involves combining the impure 2-pyrrolidone with the boron oxide compound and thereafter subjecting the mixture to distillation in a conventional manner. Thus for example standard vacuum distillation apparatus can be employed. Generally the distillation is conducted under an inert atmosphere, as for example nitrogen, with agitation of the material being distilled. In the course of distillation, an initial forerun is collected and can be discarded or disposed of in appropriate fashion with the bulk of the 2-pyrrolidone which is distilled from the distillation mixture being collected and used directly in the desired application, e.g. polymerization.

The boron compounds which are suitable include boron oxide ($B_2O_3$), the boric acids such as orthoboric acid ($H_3BO_3$), metaboric acid ($HBO_2$), and pyroboric acid ($H_2B_4O_7$), salts thereof such as sodium borate, and the borate esters.

The amount of the purifying agent added will of course depend upon the purity of the 2-pyrrolidone starting material. Generally very satisfactory results are obtained with the addition of from 0.1 to 0.5% by weight. Amounts as low as 0.02% can be employed with 2-pyrrolidone from some sources while an amount as high as 5% will have no adverse affect on the purification and the use of such an excess is governed solely by economic considerations.

It has been shown that the use of 2-pyrrolidone which has been purified according to the present invention results in faster polymerizations, a higher quality product and increased reproducibility with different batches of commercial 2-pyrrolidone. These results and the advantages of the purification reagent as contrasted with those of the prior art render the present purification technique a valuable improvement in the large scale production of polymers of 2-pyrrolidone.

The following examples will serve to further typify the nature of the present invention but should not be construed as a limitation on the scope thereof, the scope being defined solely by the appended claims.

Example 1

Commercially purchased pyrrolidone was placed in a distillation apparatus comprising a magnetic stirrer, nitrogen inlet, a Claisen head and distillation condenser, and pot and head thermometers. A vacuum was applied to the system until the pressure was 2 mm. Hg, at which time stirring and heating were commenced. Distillation began at a pot temperature of about 110° C. and a head temperature of 89° C. When approximately 15% of the initial charge had distilled, the head temperature rose to about 93° C. Heating was then temporarily discontinued and the apparatus filled with dry nitrogen. The distillate forerun was discarded and the pressure again reduced to 2 mm. Hg with stirring and heating then resumed. At a pot temperature of about 101° C.±2° and a head temperature of about 88° C.±2°, approximately 70% of the charge was collected. Distillation was discontinued upon a rise in the pot temperature.

Parallel distillations were conducted as described above with the exception that to the initial charge was added the indicated amount of purifying agent. This material generally dissolved at a pot temperature of about 70° C.

The purified 2-pyrrolidone obtained as above was polymerized as follows. A 100 g. charge of 2-pyrrolidone was placed in a reaction vessel equipped with a magnetic stirrer, nitrogen inlet, dip tube and distillation head. To the vessel were next added 7.75 g. of 85% potassium hydroxide pellets. The system was then evacuated, and the contents of the vessel stirred and heated. The potassium hydroxide quickly dissolved and upon a rise in the head temperature, the flask was immediately cooled to about 30° C. Carbon dioxide was next introduced into the flask beneath the liquid surface through the dip tube until a concentration of 3 mol percent of carbon dioxide was reached. Nitrogen was next introduced into the system until atmospheric pressure was reached and the reaction mixture immediately poured into polymerization containers previously flushed with nitrogen. The polymerization containers were quickly capped and heated in an oven at 50° C. for twenty-two hours to complete polymerization. The polymerizate was then ground, washed thoroughly with water and dried at 100° C. overnight. The percent conversion of the monomer and the inherent viscosity of the resultant polymer were then determined.

Following the above procedure without addition of any purification reagent, a 39.0% conversion of 2-pyrrolidone to the polymer was achieved with the polymer demonstrating an inherent viscosity of 3.5. Addition of 0.1% (200 mg.) of boric acid ($H_3BO_3$) resulted in a percent conversion of 2-pyrrolidone to polymer of 50.2% with the polymer demonstrating an inherent viscosity greater than 4.6.

Example 2

Following the procedure described in Example 1 and utilizing the identical apparatus, the following results were obtained:

| Purification reagent | Percent Reagent | Percent Conversion | Inherent viscosity |
|---|---|---|---|
| Control | 0 | 28.4 | 3.6 |
| Boric acid | 0.5 | 44.6 | >4.6 |
| Boron oxide | 0.1 | 46.0 | 4.6 |
| Do | 0.5 | 46.7 | >4.6 |

Similar improvements in percent conversion and in the polymer obtained are observed with the use of other hydrates of boron oxide, sodium borate and borate esters.

The inherent viscosity (the quotient of the natural log of the relative viscosity divided by the concentration) was determined in a Cannon-Ubbelohde viscometer at 25° C. utilizing a 0.5% solution of polymer in hexafluoroisopropanol.

What is claimed is:

1. The process for the purification of 2-pyrrolidone which comprises mixing the 2-pyrrolidone to be purified with a boron compound selected from the group consisting of boron oxide, a boric acid and a borate, subjecting the mixture to distillation under reduced pressure, and collecting the purified pyrrolidone as distillate.

2. The process according to claim 1 wherein the amount of said boron compound is from about 0.02 to about 5% by weight of the 2-pyrrolidone to be purified.

3. The process according to claim 1 wherein said boron compound is boron oxide.

4. The process of claim 3 wherein the boron oxide is used in an amount of from about 0.1 to about 0.5%.

5. The process according to claim 1 wherein said boron compound is orthoboric acid.

6. The process of claim 5 wherein the orthoboric acid is used in an amount of from about 0.1 to about 0.5%.

References Cited

UNITED STATES PATENTS

| 3,270,058 | 8/1966 | Sutcliffe | 203—60 |
| 2,944,944 | 7/1960 | Clayton | 203—17 |
| 3,290,329 | 12/1966 | Doerfel | 260—326.5 |

NORMAN YUDKOFF, Primary Examiner

F. SEVER, Assistant Examiner

U.S. Cl. X.R.

203—60, 34, 33, 91; 260—326.5 FN